(No Model.) 2 Sheets—Sheet 1.
M. D. PORTER & E. R. WILDER.
ELECTRICAL ALARM APPARATUS.
No. 296,875. Patented Apr. 15, 1884.
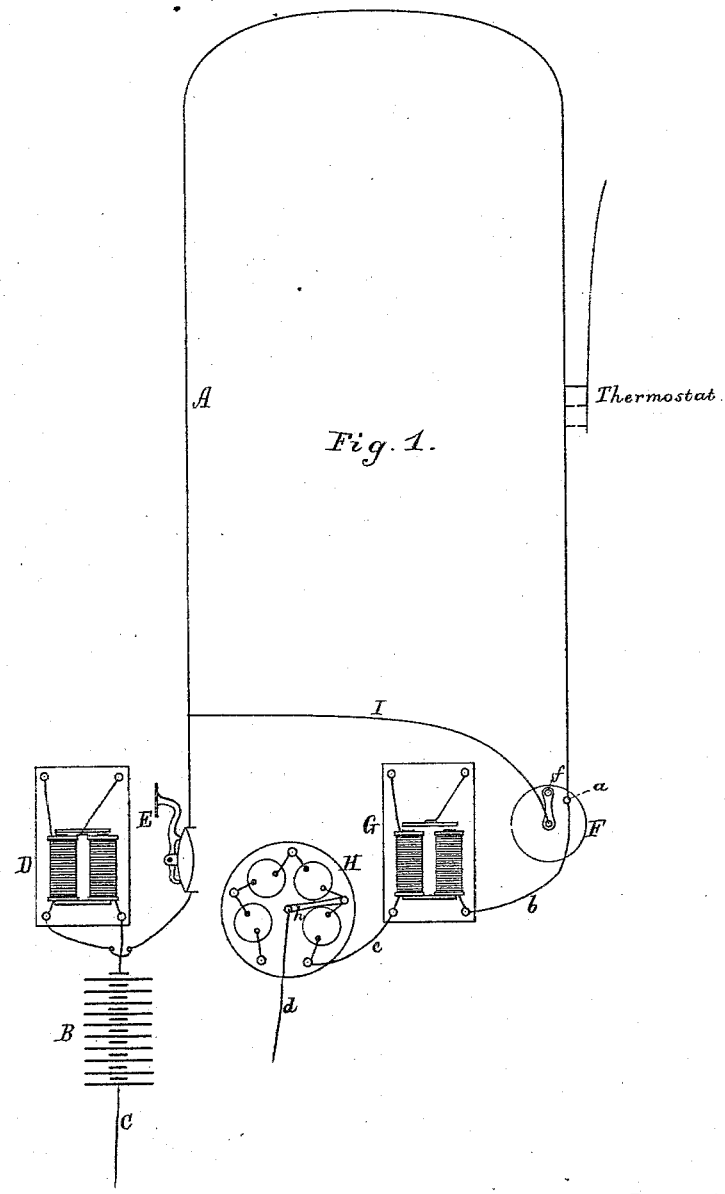
Witnesses
S. N. Piper
E. B. Pratt
Inventors
Major Dane Porter.
Edmund Raynsford Wilder.
by R. H. Eddy atty

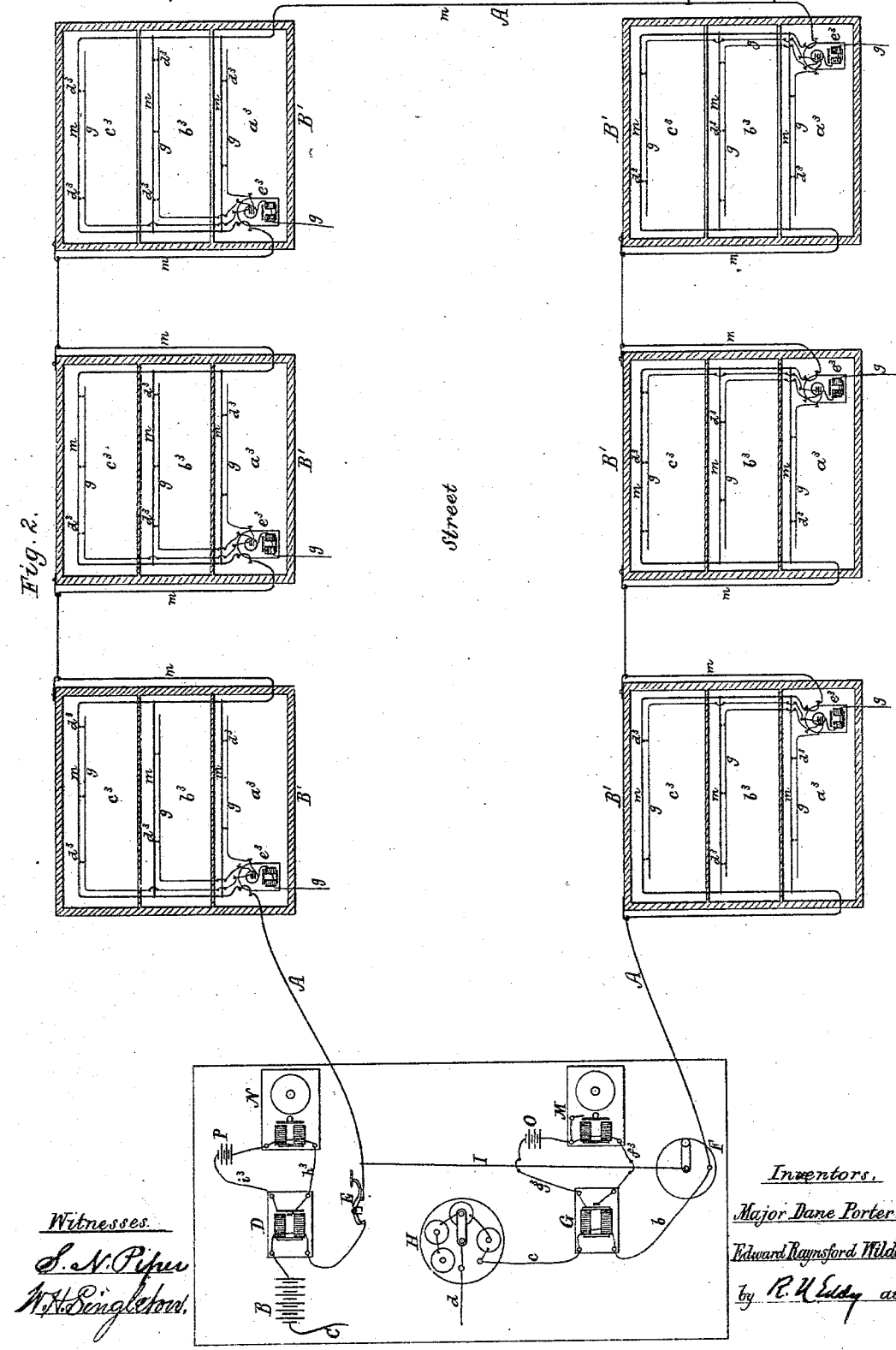

UNITED STATES PATENT OFFICE.

MAJOR DANE PORTER, OF BOSTON, MASSACHUSETTS, AND EDMUND RAYNSFORD WILDER, OF PORTLAND, MAINE, ASSIGNORS, BY MESNE ASSIGNMENTS, TO SAID PORTER.

ELECTRICAL ALARM APPARATUS.

SPECIFICATION forming part of Letters Patent No. 296,875, dated April 15, 1884.

Application filed December 11, 1883. (No model.)

*To all whom it may concern:*

Be it known that we, MAJOR DANE PORTER, a resident of Boston, in the county of Suffolk, of the Commonwealth of Massachusetts, a native of Nova Scotia, and a subject of the Queen of Great Britain, and EDMUND RAYNSFORD WILDER, a resident of Portland, in the county of Cumberland, of the State of Maine, and a citizen of the United States of America, have invented a new and useful Improvement in Electrical Alarm Apparatus; and we do hereby declare the same to be described in the following specification and represented in the accompanying drawings, of which—

Figure 1 exhibits an electric circuit provided with our invention, the nature of which is defined in the claims hereinafter presented. Fig. 2 is a sketch showing the said invention as having applied to the electric circuit not only a series of buildings having thermostats and transmitters, and also having ground-wires to the latter, but having a vibrator-alarm and a gong-alarm, all being as hereinafter explained.

In Fig. 1 of such drawings, A may be supposed to represent the main circuit of a fire-alarm system, such circuit being properly connected with a series of buildings, having in each one or more suitable thermostats, or mechanism for closing the circuit in case of a fire occurring in the buildings. The apparatus is not only to give notice to the battery-station of such circuit when an accidental break may occur in the circuit, but is also to prepare the circuit for operation while the break may continue, that, in case of fire taking place in either part of the circuit that may be beyond the break, such circuit shall be operative to give notice thereof. In Fig. 1 the battery of the circuit is shown at B, and the ground-wire thereof at C. Close to such battery is a relay, D, whose electro-magnet is duly connected with the battery for the current therefrom to pass through the said magnet. The circuit-wire continues from the magnet, and we usually arrange in it a key, E, for testing the circuit. Furthermore, the circuit communicates with the stud *a* of a switch, F. From the said stud the wire is continued, as shown at *b*, to another relay—that is, to the electric magnet thereof. From the said magnet a wire, *c*, leads to one or a series of resistance-coils, H, from which a wire, *d*, has electric communication with the ground. A branch wire, I, is led from the pivot of the switch-arm *f* to the circuit-wire A, just in advance of the key. When two or more resistance-coils are used, they are connected so that the current may pass through them successively, they being arranged in a circle, and provided with an arm or switch, *h*, jointed so as to be capable of being swung from one to the other of them, the ground-wire *d* in such case leading from the pivot to the switch, the whole being so as to enable one or more of such resistance-coils to be put into action with the circuit, as occasion may require. The object of the resistant coil or coils is to weaken the current passing through the magnets of the two relays, so as to render it insufficient to close the armature of the relay D, though sufficient to close that of relay G, the retracting-spring of the armature of the relay D being caused with greater force to keep the armature from its magnet than does the spring of the relay G.

From the above it will be seen that in case of a break in the main circuit the magnet of relay G will be demagnetized, and as a consequence its armature will fall or be drawn away from it. On thus falling back this armature is to close an electrical-alarm circuit, and thereby cause an alarm to be sounded, to give notice that the main circuit has been broken. On such an alarm being given, the arm *f* of the switch F is to be turned upon the stud *a*, in which case the armature of relay G will be closed or drawn up to its magnet, and the alarm will cease to sound, and the current will flow through the wire I. Now, should a fire occur in any building through which the main circuit A may run, and the thermostat in such building be caused thereby to close the circuit, such thermostat having a ground-connection, the armature of relay D would be drawn to its magnet, and the armature of relay G would fall away from its magnet, and thus notice by this action of the relay D would be given of the existence of such fire. Should the armature of relay D have applied to it the circuit of an electric alarm, such armature may be used to close the said circuit, so as to cause its alarm to be sounded thereby. The key E is to be closed while the apparatus is without any break, it being used simply to aid in testing the line, or to aid in determining, in a manner well understood by electricians, the place where the break may occur.

In Fig. 2, A is the circuit; B', a series of six buildings, which may be supposed to be arranged on opposite sides of the street—that is, three of them on one and the other three on the other side of it. The stories of each building are marked in their order, $a^3$, $b^3$, and $c^3$. In said Fig. 2 the main wires of the circuit are marked $m$, and the ground-wires $g$, there being in each story of each building—that is, to its main and ground wires—one or more thermostats, $d^3$, of some proper or well-known kind. There is also in the lower story of each building a transmitter, $e^3$, of suitable construction. Furthermore, in said Fig. 2, M denotes what is usually termed a "vibratory electric alarm," and N a "gong electric alarm," with their local batteries shown at O and P, and circuit-wires $f^3$, $g^3$, $h^3$, and $i^3$, to connect them with the two relays D and G, hereinbefore described, as shown in Fig. 1. In Fig. 2 there are also represented the key E, switch F, wire I, resistance-coils H, and wires $b$, $c$, and $d$, hereinbefore described, and shown in Fig. 1.

Although we have represented the circuit A substantially as usually applied to a series of buildings provided with thermostats, transmitters, and main and ground wires, and have also exhibited the usual vibratory and gong alarms, and with such devices for sounding alarms in case of a fire occurring in any story of any of such buildings, we wish it distinctly understood that we make no claim to such.

We claim—

1. The combination of the electric-alarm circuit A, battery B, switch F, auxiliary wire I, two relays, D and G, and one or more resistance-coils, H, all being adapted or applied substantially to operate as and for the purpose or purposes as set forth.

2. The combination of the electric-alarm circuit A, battery B, switch F, two relays, D and G, one or more resistance-coils, H, auxiliary wire I, and the connecting-wires $b$ $c$, constructed and arranged as described.

3. The combination of the electric-alarm circuit A, battery B, switch F, having the stud $a$ and switch-arm $f$, two relays, D and G, the resistance-coils H and their arm $h$, auxiliary wire I, and connecting-wires $b$ $c$, all constructed and arranged as and for the purpose set forth.

MAJOR DANE PORTER.
EDMUND RAYNSFORD WILDER.

Witnesses:
R. H. EDDY,
E. B. PRATT.